US00RE45709E

(19) United States
(12) Reissued Patent
Lehmann

(10) Patent Number: US RE45,709 E
(45) Date of Reissued Patent: Oct. 6, 2015

(54) BUSINESS HANGER

(71) Applicant: Pathway IP SARL, Luxembourg (LU)

(72) Inventor: Andreas Lehmann, Uitikon Waldegg (CH)

(73) Assignee: Pathway IP SARL, Luxembourg (LU)

(21) Appl. No.: 29/474,604

(22) Filed: Nov. 19, 2014

Related U.S. Patent Documents

Reissue of:
(64) Patent No.: Des. 714,568
Issued: Oct. 7, 2014
Appl. No.: 29/480,086
Filed: Jan. 23, 2014

(30) Foreign Application Priority Data

Oct. 10, 2013 (WO) ..... 767320301

(51) LOC (10) Cl. ..... 06-06
(52) U.S. Cl.
USPC ..... D6/516; D3/293
(58) Field of Classification Search
USPC ..... D3/293, 278; D6/512, 513, 524, 525, D6/553
CPC ..... A47F 7/02; A45C 7/0095; A45C 11/16; A47G 1/12
See application file for complete search history.

(56) References Cited

U.S. PATENT DOCUMENTS 4,401,219 A * 8/1983 Mink ..... D6/513
D320,131 S * 9/1991 Pereyra et al. ..... D6/513
D321,789 S * 11/1991 Martorella ..... D3/293
5,209,344 A * 5/1993 Smith ..... D6/513
D352,697 S * 11/1994 Johnson ..... D12/414.1
5,427,230 A * 6/1995 Mattox ..... 206/6.1
D385,419 S * 10/1997 Ibigbami ..... D3/283
D387,929 S * 12/1997 Stewart ..... D6/513
D402,840 S * 12/1998 Servis ..... D6/553
D410,120 S * 5/1999 Norman et al. ..... D32/36
D429,897 S * 8/2000 Rogman et al. ..... D6/571
6,874,624 B2 * 4/2005 Redzisz ..... 206/278
D544,274 S * 6/2007 Hume ..... D6/553
7,389,868 B2 * 6/2008 Lewand et al. ..... 206/6.1
D627,163 S * 11/2010 Kittrell ..... D3/283

* cited by examiner

*Primary Examiner* — Phillip S Hyder
(74) *Attorney, Agent, or Firm* — Wood, Herron & Evans, LLP

(57) CLAIM

The ornamental design for a business hanger, as shown and described.

DESCRIPTION

FIG. 1 is *a front perspective view of a* business hanger of the present invention;
FIG. 2 is a front view of FIG. 1 of the present invention;
FIG. 3 is a left side view of FIG. 1 of the present invention. The right side view is a mirror image thereof;
FIG. 4 is a top view of FIG. 1 of the present invention;
FIG. 5 is a bottom view of FIG. 1 of the present invention;
FIG. 6 is [is] a rear view of FIG. 1 of the present invention;
FIG. 7 is a perspective view of a business hanger of the present invention in an alternative position with the screen rolled up; and,
FIG. 8 is a front view of FIG. 7 of the present invention showing the screen rolled up.

1 Claim, 6 Drawing Sheets

Figure 1:
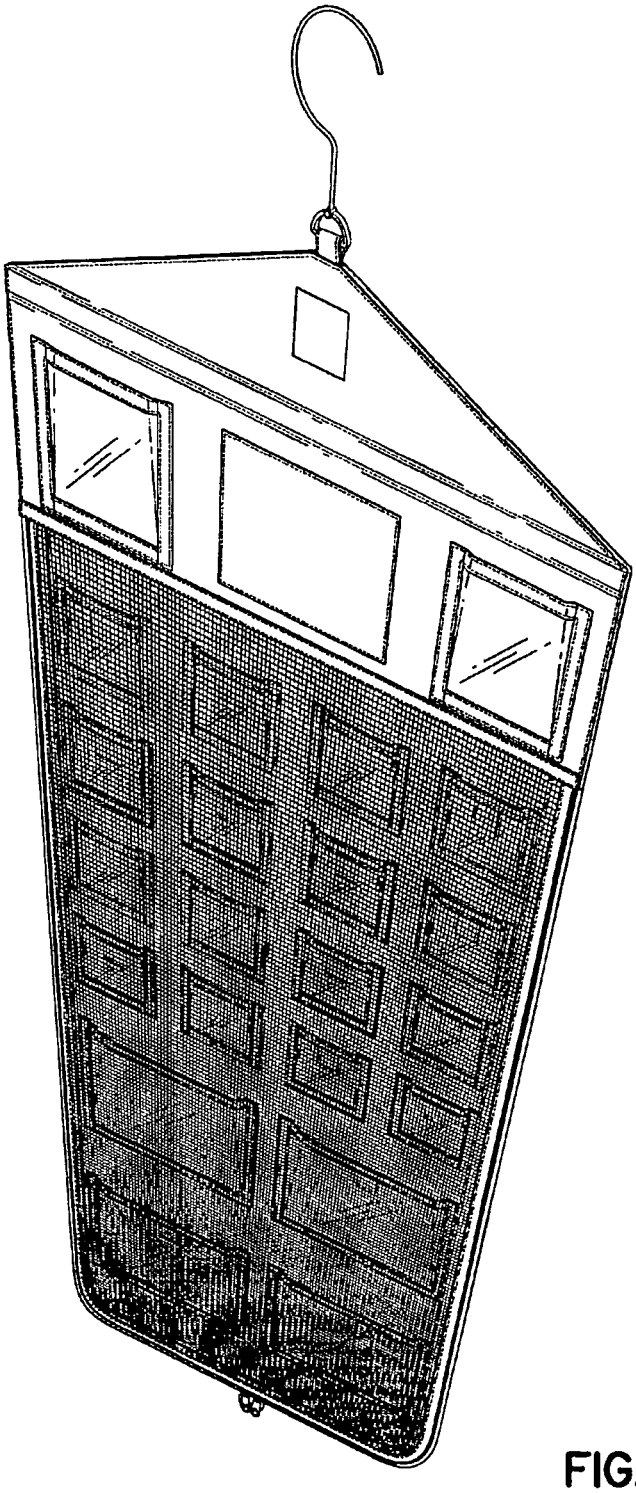
Figure 2:
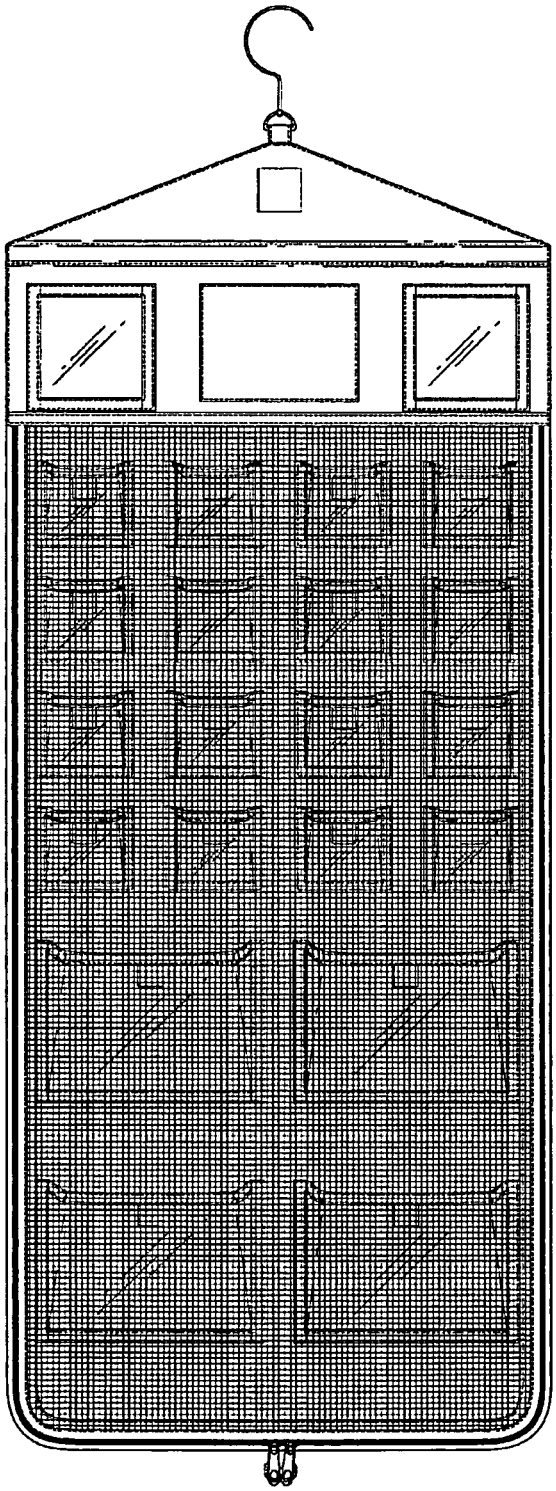
Figure 3:
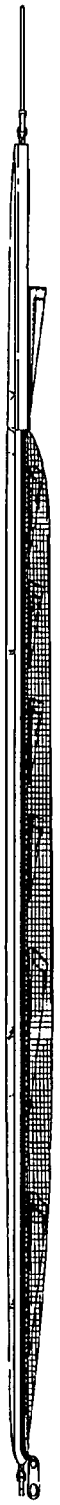
Figure 4:
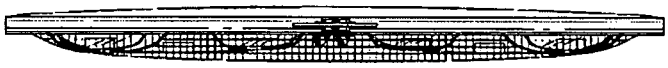
Figure 5:
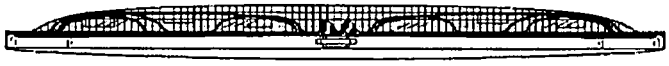
Figure 6:
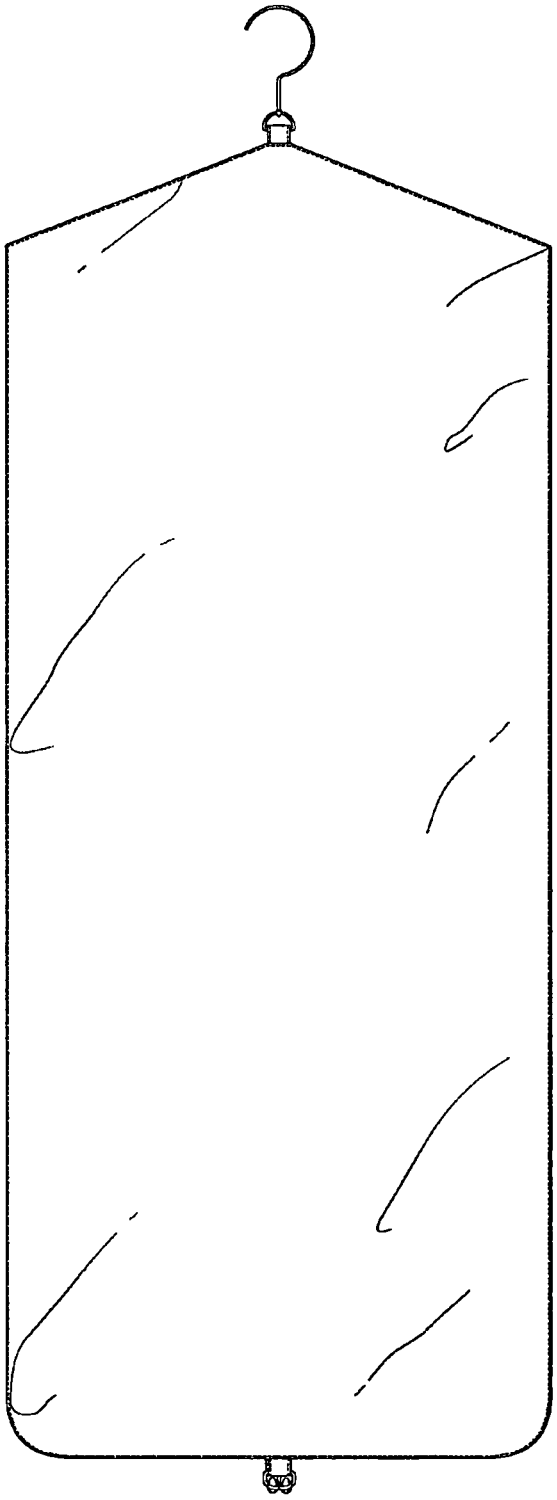
Figure 7:
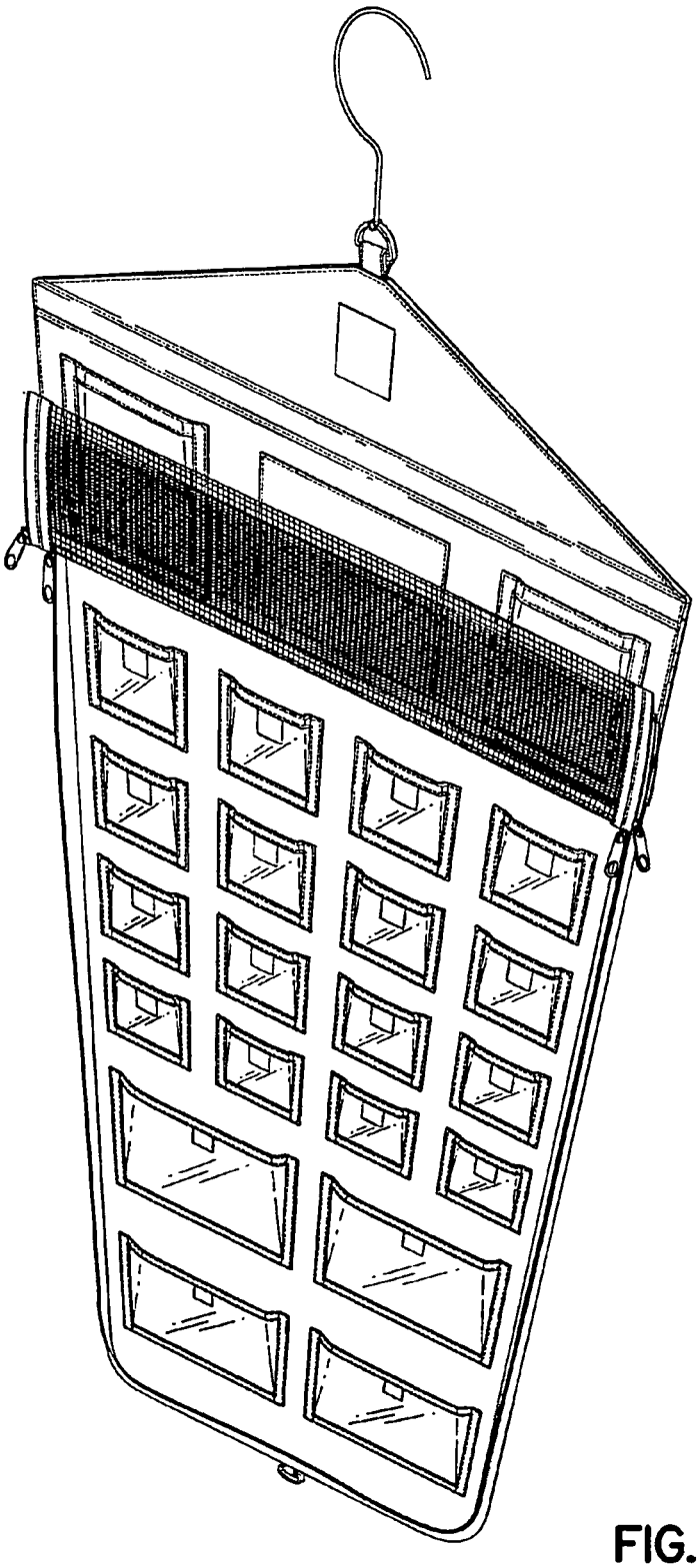
Figure 8:
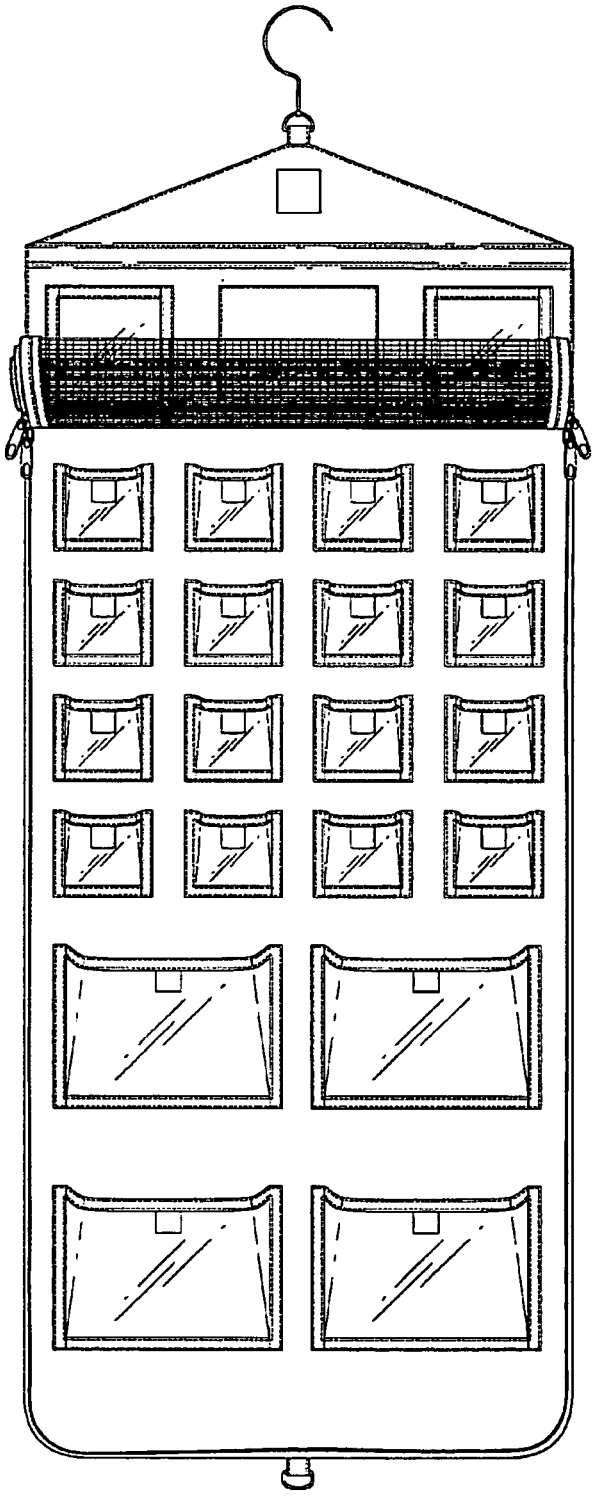

Matter enclosed in heavy brackets [ ] appears in the original patent but forms no part of this reissue; matter printed in italics indicates the additions made by reissue.